United States Patent
Foskey et al.

(10) Patent No.: US 11,858,629 B2
(45) Date of Patent: Jan. 2, 2024

(54) SLIDING PANEL FOR DOWNLOAD ALLEVIATION ON HIGH-SPEED VTOL AIRCRAFT

(71) Applicant: Bell Textron Inc., Fort Worth, TX (US)

(72) Inventors: Christopher E. Foskey, Keller, TX (US); Ryan Q. Dunham, Livonia, MI (US)

(73) Assignee: Textron Innovations Inc., Providence, RI (US)

( * ) Notice: Subject to any disclaimer, the term of this patent is extended or adjusted under 35 U.S.C. 154(b) by 18 days.

(21) Appl. No.: 17/516,087

(22) Filed: Nov. 1, 2021

(65) Prior Publication Data

US 2023/0132705 A1  May 4, 2023

(51) Int. Cl.
*B64C 9/34* (2006.01)
*B64C 9/14* (2006.01)
*B64C 13/24* (2006.01)
*B64C 27/52* (2006.01)
*B64C 9/02* (2006.01)

(52) U.S. Cl.
CPC .................. *B64C 9/34* (2013.01); *B64C 9/02* (2013.01); *B64C 9/14* (2013.01); *B64C 13/24* (2013.01); *B64C 27/52* (2013.01)

(58) Field of Classification Search
None
See application file for complete search history.

(56) References Cited

U.S. PATENT DOCUMENTS

| 6,981,676 | B2 * | 1/2006 | Milliere | B64C 9/323 244/218 |
| 11,518,496 | B2 * | 12/2022 | Dahl | B64C 9/04 |
| 2015/0375860 | A1 * | 12/2015 | Hong | B64D 35/08 244/12.4 |
| 2018/0099736 | A1 * | 4/2018 | Kordel | B64C 3/187 |

* cited by examiner

*Primary Examiner* — Brady W Frazier
*Assistant Examiner* — Nevena Aleksic
(74) *Attorney, Agent, or Firm* — Frost Brown Todd LLP

(57) ABSTRACT

A wing apparatus and aircraft are described providing greater maneuverability and efficiency for vertical takeoff and landing vehicles. Use of a fowler flap is shown in combination with a sliding panel. The sliding panel can nest within a wing similar to a fowler flap. During vertical maneuvers the sliding panel can be moved forward and on top of the wing. This can alleviate download during vertical maneuvers while minimizing drag as forward flight begins.

20 Claims, 12 Drawing Sheets

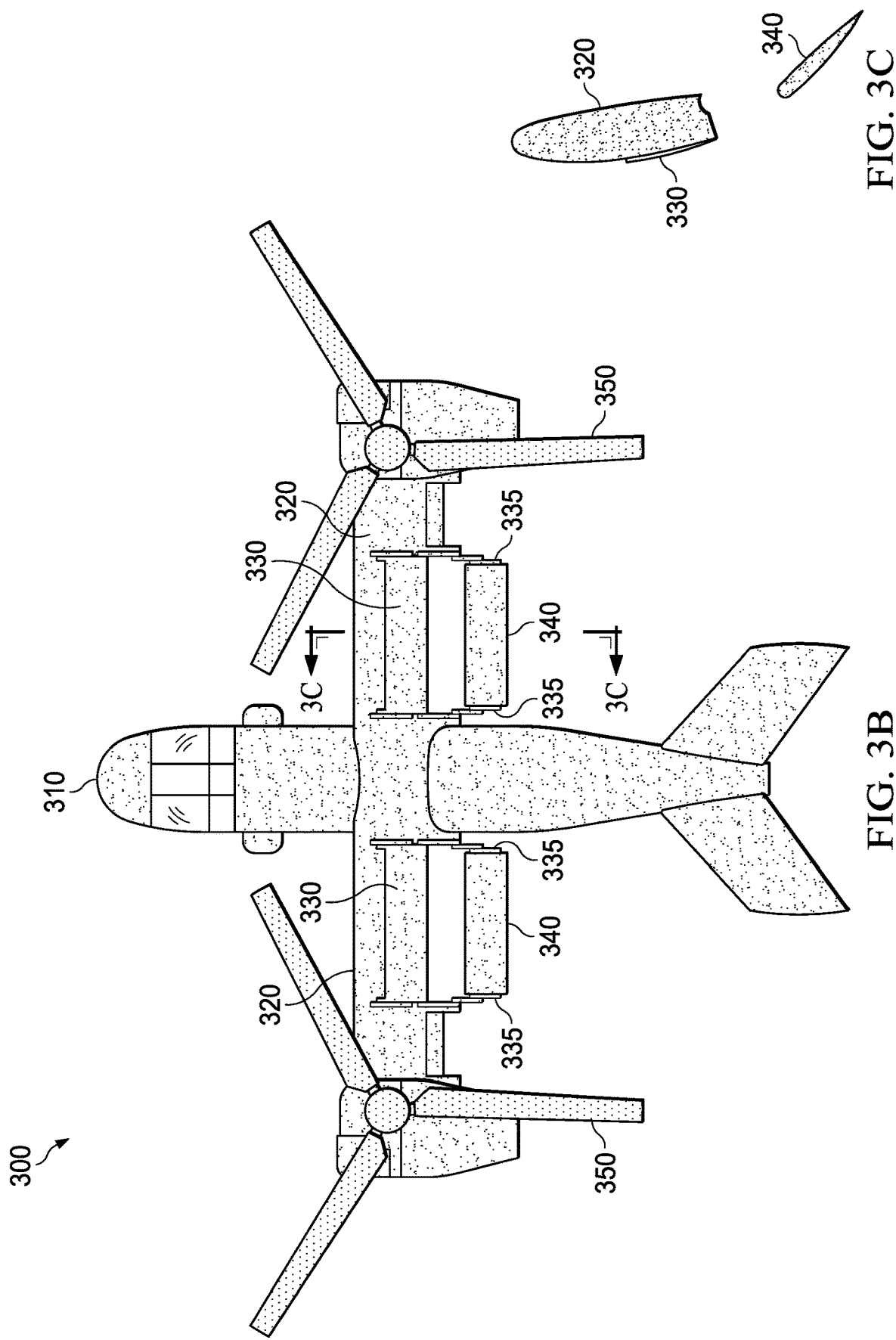

SLIDING PANEL FOR DOWNLOAD ALLEVIATION ON HIGH-SPEED VTOL AIRCRAFT

TECHNICAL FIELD

The present disclosure is directed to vertical takeoff and landing aircraft.

BACKGROUND OF THE INVENTION

Vertical takeoff and landing (VTOL) aircraft have valuable capabilities for both civilian and military applications. Such vehicles can access tough to reach locations, for example, eschewing the need for long runways. One drawback to these vehicles is they tend to have lower maximum speeds than other conventional airplanes.

BRIEF SUMMARY OF THE INVENTION

One embodiment under the present disclosure comprises a wing apparatus for an aircraft, comprising: a wing body configured to provide lift to an aircraft during flight; a fowler flap apparatus comprising a fowler flap, a first attachment means and a first deployment means, the first attachment means configured to couple the fowler flap to the wing body, and the first deployment means configured to deploy and retract the fowler flap aft of the wing body; and a sliding panel apparatus comprising a sliding panel, a second attachment means, and a second deployment means, the second attachment means configured to couple the sliding panel to the wing body, and the second deployment means configured to deploy and retract the sliding panel from a prone position on top of the wing body.

Another embodiment comprises an aircraft comprising: a fuselage; and one or more wings coupled to the fuselage and configured to provide lift during forward flight, the one or more wings comprising; a tilt rotor configured to rotate between generally vertical and generally horizontal axes of orientation, the tilt rotor comprising one or more blades configured to provide thrust along the tilt rotor's axis of orientation; a fowler flap apparatus comprising a fowler flap, a first attachment means and a first deployment means, the first attachment means configured to couple the fowler flap to the wing body, and the first deployment means configured to deploy and retract the fowler flap aft of the wing body; and a sliding panel apparatus comprising a sliding panel, a second attachment means, and a second deployment means, the second attachment means configured to couple the sliding panel to the wing body, and the second deployment means configured to deploy and retract the sliding panel from a prone position on top of the wing body.

Another embodiment comprises a method of operating an aircraft, comprising: powering up an engine of the aircraft; directing a plurality of tilt rotors comprising the aircraft in a generally vertical axis of orientation, the plurality of tilt rotors comprising one or more blades; deploying a sliding panel from a wing comprising the aircraft, the sliding panel configured to be deployed from at least partially within the wing to a prone position on top of the wing; deploying a fowler flap from the wing, the fowler flap configured to be deployed from at least partially within the wing to a position aft of the wing; providing lift to the aircraft via the one or more blades; tilting the plurality of tilt rotors to a generally horizontal axis of orientation; and providing thrust for forward flight to the aircraft via the one or more blades.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIGS. 3A-3C are diagrams of aircraft embodiments under the present disclosure;

DETAILED DESCRIPTION OF THE INVENTION

Figure 1A:
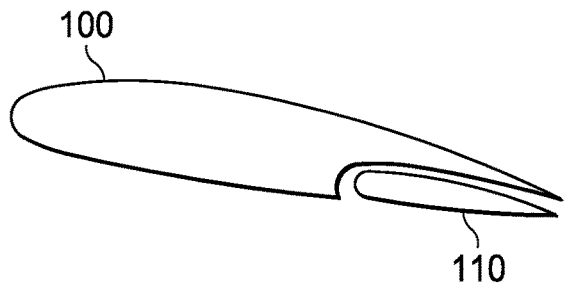
FIGS. 1A-1B are diagrams of a prior art fowler flap.
Figure 1B:
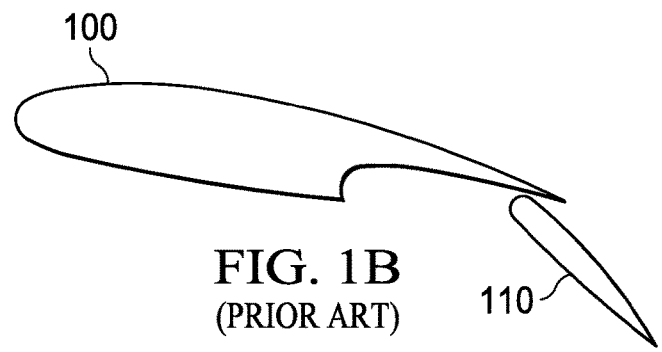

Referring now to FIGS. 1A-1B, a prior art fowler flap 110 can be seen in an aircraft wing 100. Fowler flaps are often used in commercial airplanes and other aircraft that fly at airspeeds within the transonic region. They can be helpful by increasing an effective size of a wing 100. FIGS. 1A and 1B both show wings 100 with the same weight. But when the fowler flap 110 is deployed, in FIG. 1B, more air is flowing over and under the wing, creating more lift. Thus the greater effective wing size. Fowler flaps combine two movements, sliding backwards and downward rotation. Sliding the flap backwards will increase the surface area of the wing, creating increased lift. Downward rotation will increase drag and increase the wing chord and camber. A fowler flap could be requisite on a given VTOL wing based on its high-speed cruise design, but also maintaining low speed flight lift capability. Extending a fowler flap in the chordwise direction increases the sum projected area of the aircraft thereby increasing download and reducing effective rotor thrust.

Figure 2A:
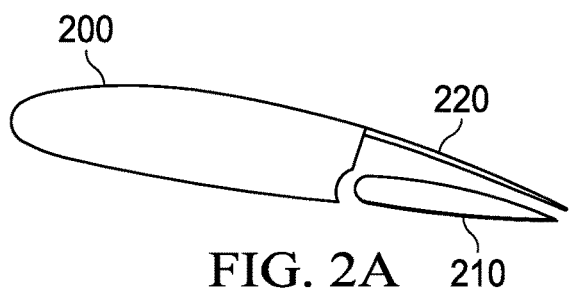
FIGS. 2A-2B are diagrams of a wing embodiment under the present disclosure.
Figure 2B:
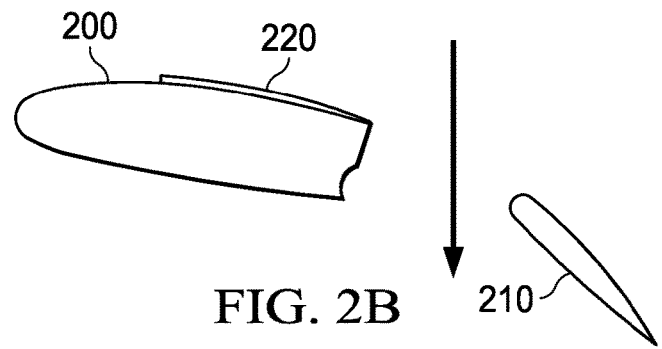

FIGS. 2A-2B show embodiments of a wing 200 with a sliding panel 220 for download alleviation under the present disclosure. FIG. 2A shows the closed position, with a similar profile to FIG. 1A. FIG. 2B shows the open position, with fowler flap 210 extended back and down from wing 200, and sliding panel 220 moved upward along the top surface of wing 200. Sliding panel 220 is preferably as close as possible to the top surface of wing 200 so as to minimize drag. Sliding panel 220 preferably comprises a portion of the top of the wing airfoil. The movement of the sliding panel 220 and the flap 210 will create an open space between the aft face of the wing box and the leading edge of the deployed fowler flap assembly. During vertical movements like take-off and landing, and transitions to/from vertical to cruise, the open space will decrease the sum projected area of the aircraft thereby decreasing download and increasing effective rotor thrust.

Besides the greater efficiency in vertical maneuvers, the embodiments described herein will allow VTOL and high speed VTOL (HSVTOL) aircraft to utilize longer or thinner wings which allow for higher speed. HSVTOL wings are designed with a minimum thickness driven by the rotor cross drive shaft diameter, thereby driving the chord length to make a wing that performs well at transonic cruise speeds. Unfortunately, such wing geometries perform poorly at low airspeeds. Traditional plain flaps would not add sufficient lift to these thin transonic-speed designed wings during low speed flight, therefore the chord extension and camber increase provided by a fowler flap makes them capable of generating requisite lift at low airspeed. The sliding panels described herein allow for download alleviation so that the described fowler flaps don't hamper a VTOL's capability in vertical maneuvers, while simultaneously allowing for the longer chord and thinner wings needed for high speeds.

Figure 3A:
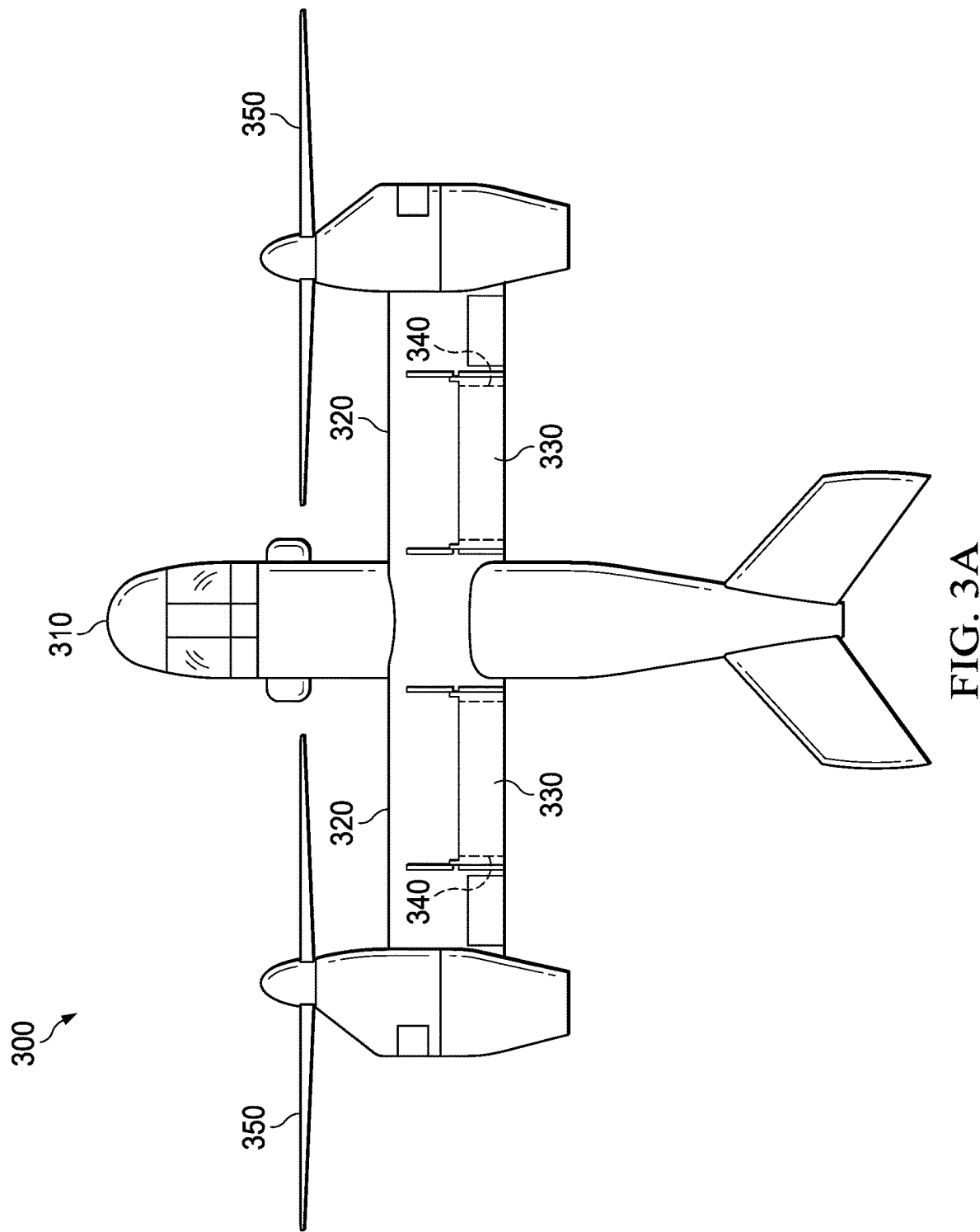

FIGS. 3A-3B show a top-down view of an HSVTOL embodiment under the present disclosure. HSVTOL 300 comprises a fuselage 310, wings 320, and tilt rotors 350. In FIGS. 3A-3B tilt rotors 350 are directed upward, such as during takeoff or landing. In FIG. 3A sliding panel 330 and fowler flap 340 are in a stowed position along wings 320. In FIG. 3B the sliding panel has been moved on top of wing 320 and fowler flap 340 has been extended backward and/or downward. Brackets 335 can be used to extend the fowler flap 340, revealing a gap between the fowler flap 340 and wing 320 and sliding panel 330. In FIG. 3B, the HSVTOL 300 is shaded to assist in showing the open gap or path created when the sliding panel 330 and fowler flap 340 are deployed. The gap creates different downloads between HSVTOL in FIG. 3A and FIG. 3B. Brackets 335 may optionally extend further up along or within wing 320 to allow for the actuation of the sliding panels 330. Alternatively, sliding panels 330 may move along separate brackets. FIG. 3C shows the wing 320 of FIG. 3B, but from a side view. The sliding panel 330 can be seen on top, and the fowler flap 340 deployed away from the wing 320, revealing an open space for air flow.

Figure 4:
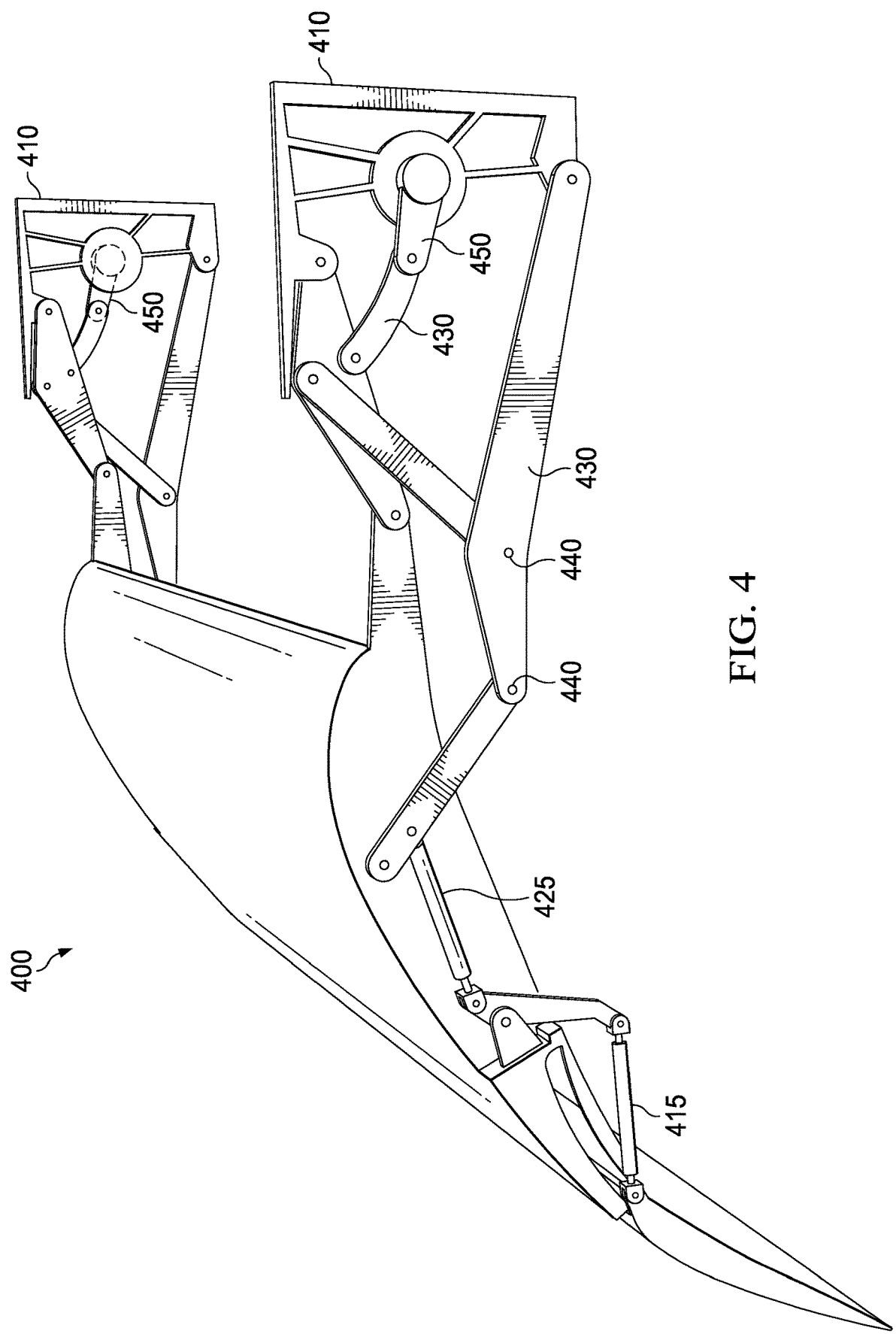
FIG. 4 is a diagram of a fowler flap embodiment under the present disclosure.

The attachment to the wing, actuation, and movement of fowler flaps 340 and sliding panels 330 may be accomplished by any appropriate means. Brackets, rotational screws, ball screws, tracks, linear actuators, rotational actuators, springs, rails, bolts, or other means may be used. One possible embodiment of a fowler flap is shown in FIG. 4. Fowler flap 400 can be coupled to a wing or wing spar (not shown) by attachments 410. A plurality of brackets 430 can be coupled and rotate about joints 440. Actuators 415 and 425 can extend portions of fowler flap 400. Another actuator 450 may be rotational and can assist in deploying and extending brackets 430 away from the wing or wing spar. Other embodiments may include additional, or fewer attachments 410, or a different specific configuration of brackets 430, joints 440, actuators 415, 425, 450.

Figure 5:
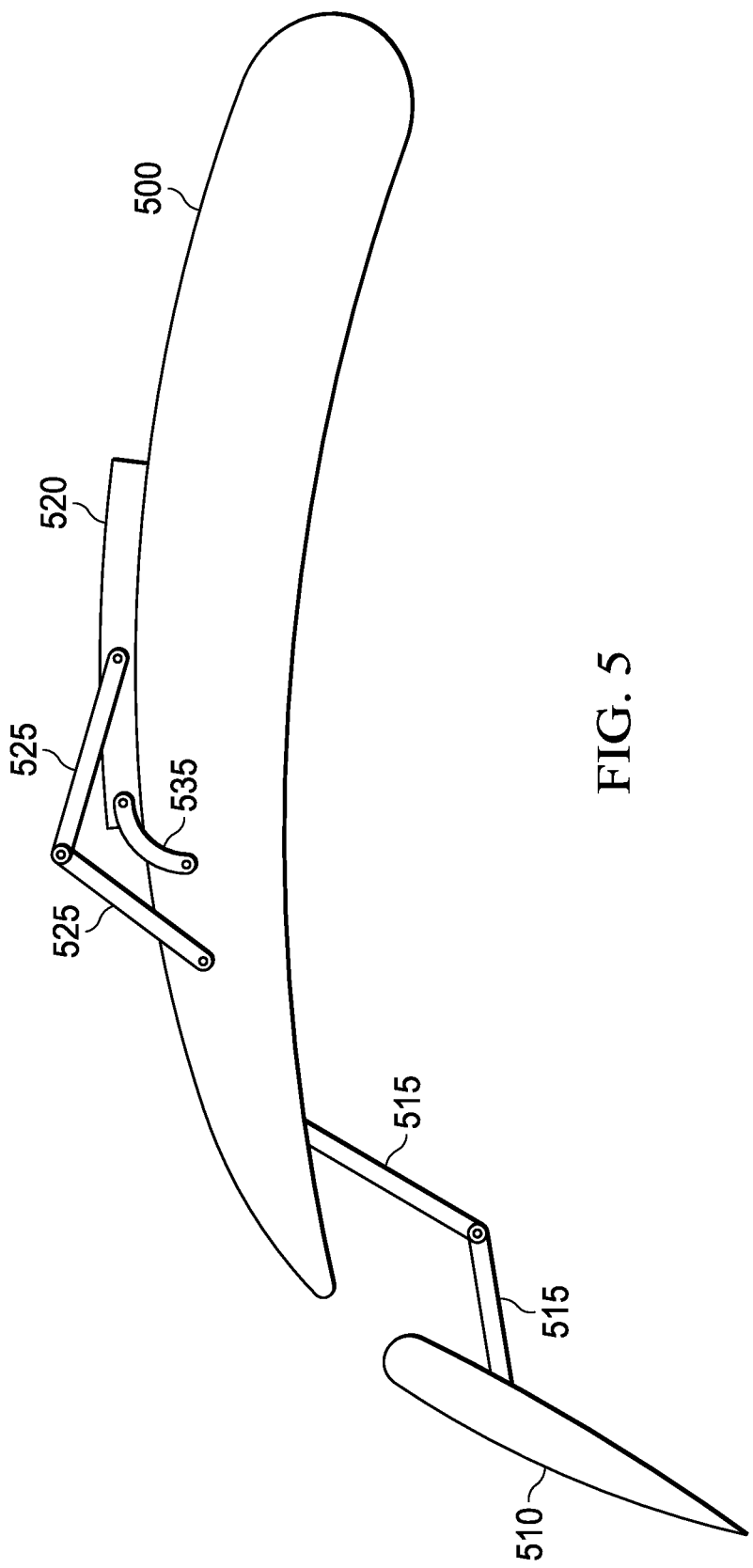
FIG. 5 is a diagram of a sliding panel embodiment under the present disclosure.

FIG. 5 shows a possible embodiment of a sliding panel. Wing 500 comprises a fowler flap 510 and sliding panel 520. Wing 500 is shown here with both the fowler flap 510 and sliding panel 520 deployed. Brackets 515 can be actuated to extend fowler flap 510, while brackets 525, 535 can be actuated to move sliding panel 520 on top of wing 500. Sliding panel 520 preferably rests on, or very close to, the top surface of wing 500 so as to minimize drag once forward movement has begun.

Figure 6A:
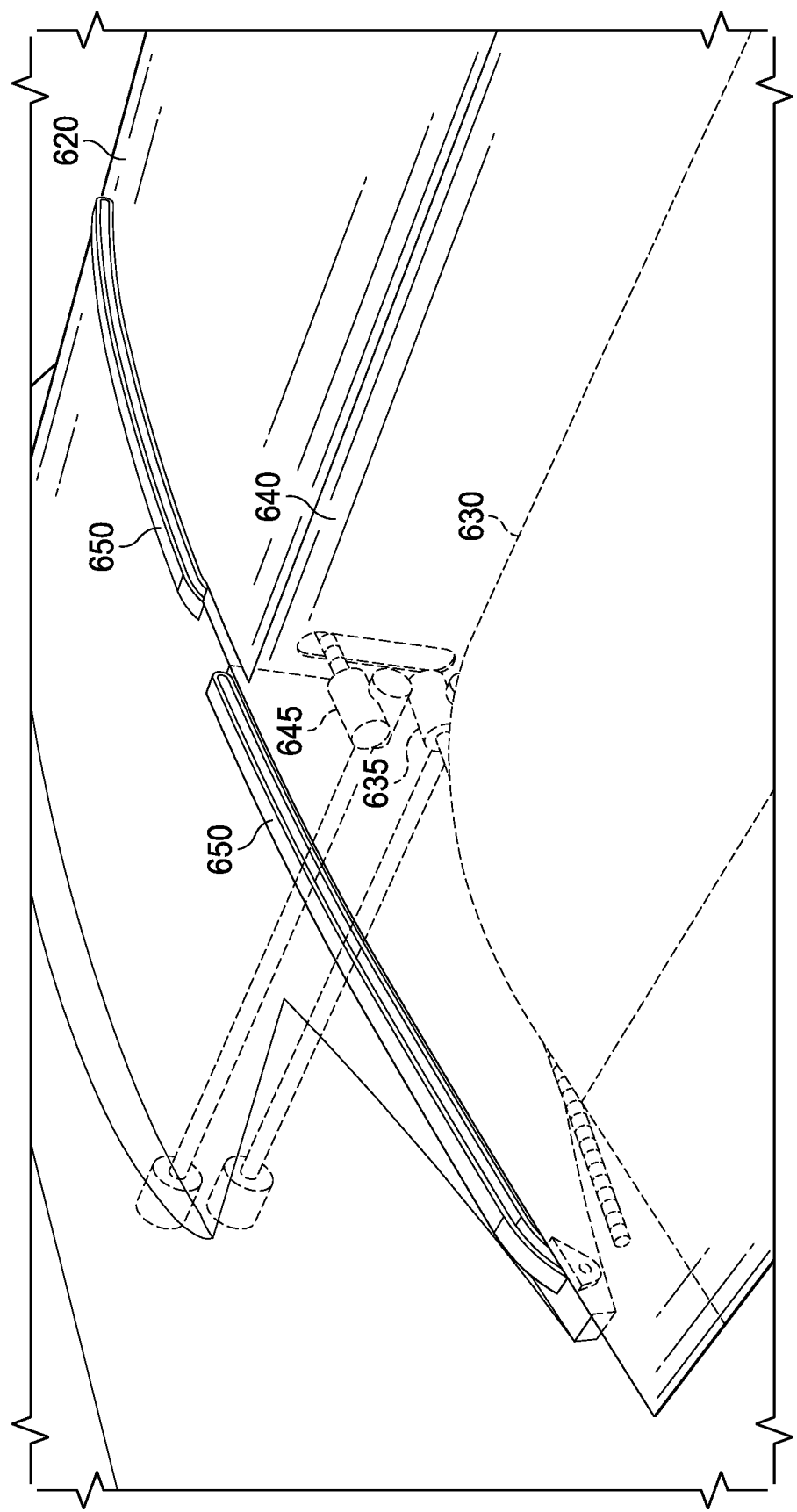
FIGS. 6A-6B show a sliding panel and wing embodiment under the present disclosure.
Figure 6B:
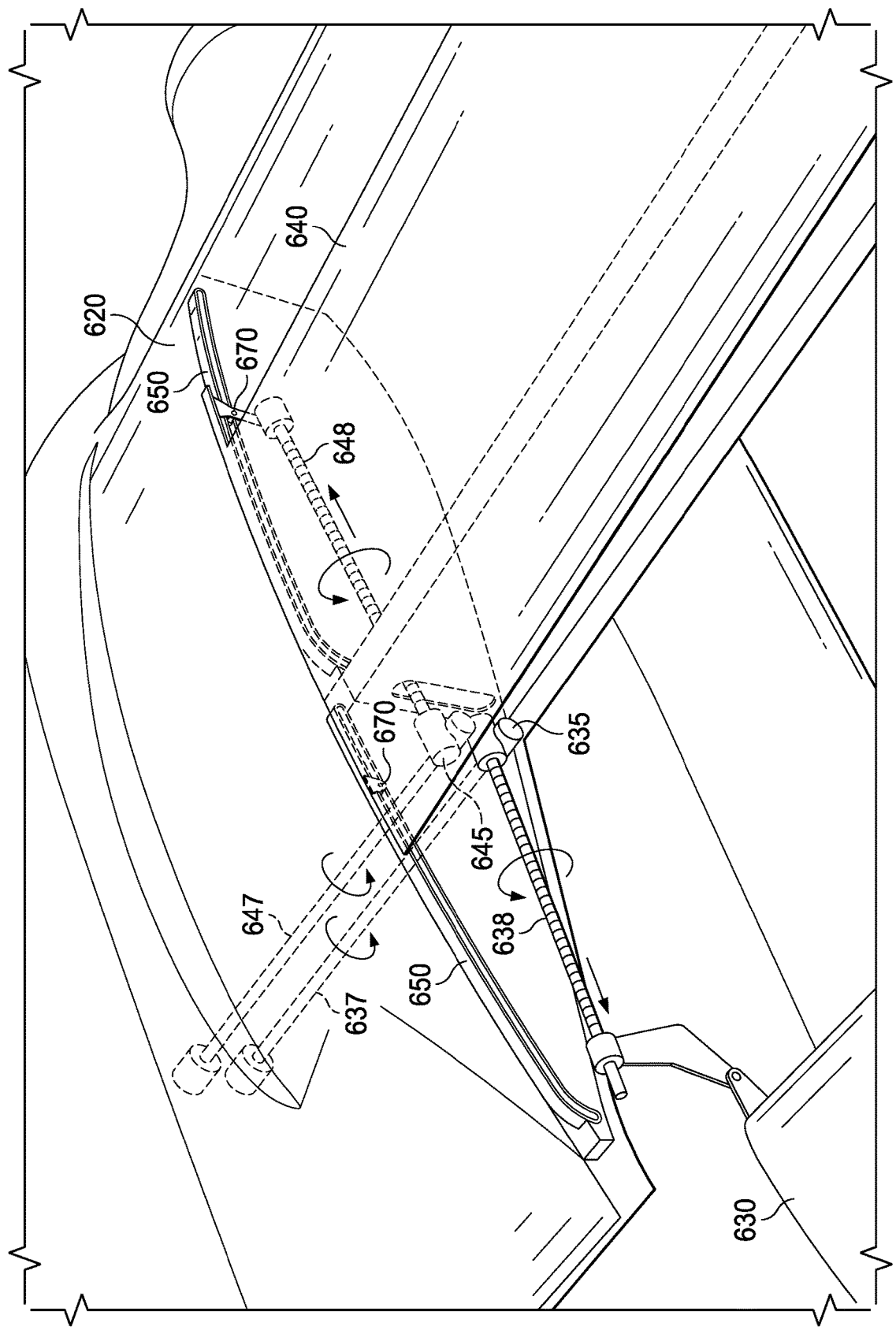

FIGS. 6A-6B show another embodiment of a sliding panel—this one a "minivan door" style embodiment. Tracks 650 can attach or be integrated into wing 620. In FIG. 6A, sliding panel 640 and fowler flap 630 are not deployed. Deployment of the sliding panel 640 can be achieve with 90-degree gearboxes 635, 645 and ball screws 637, 638, 647, 648. The 90-degree gearboxes allow the rotation of the spanwise ball screws 637, 647 to actuate the chordwise ball screws 638, 648 to create the fore and aft motions for the door and flap assemblies to deploy and retract. FIG. 6B shows the sliding panel 640 and the fowler flap 630 both in deployed positions. Ball screws 637, 647 can connect to the gearboxes 635, 645 from a controller or other component in an airplane. Wheels 670 connect to the sliding panel 640 and can be inserted into tracks 650 and allow sliding panel 640 to move along tracks 650.

Figure 7A:
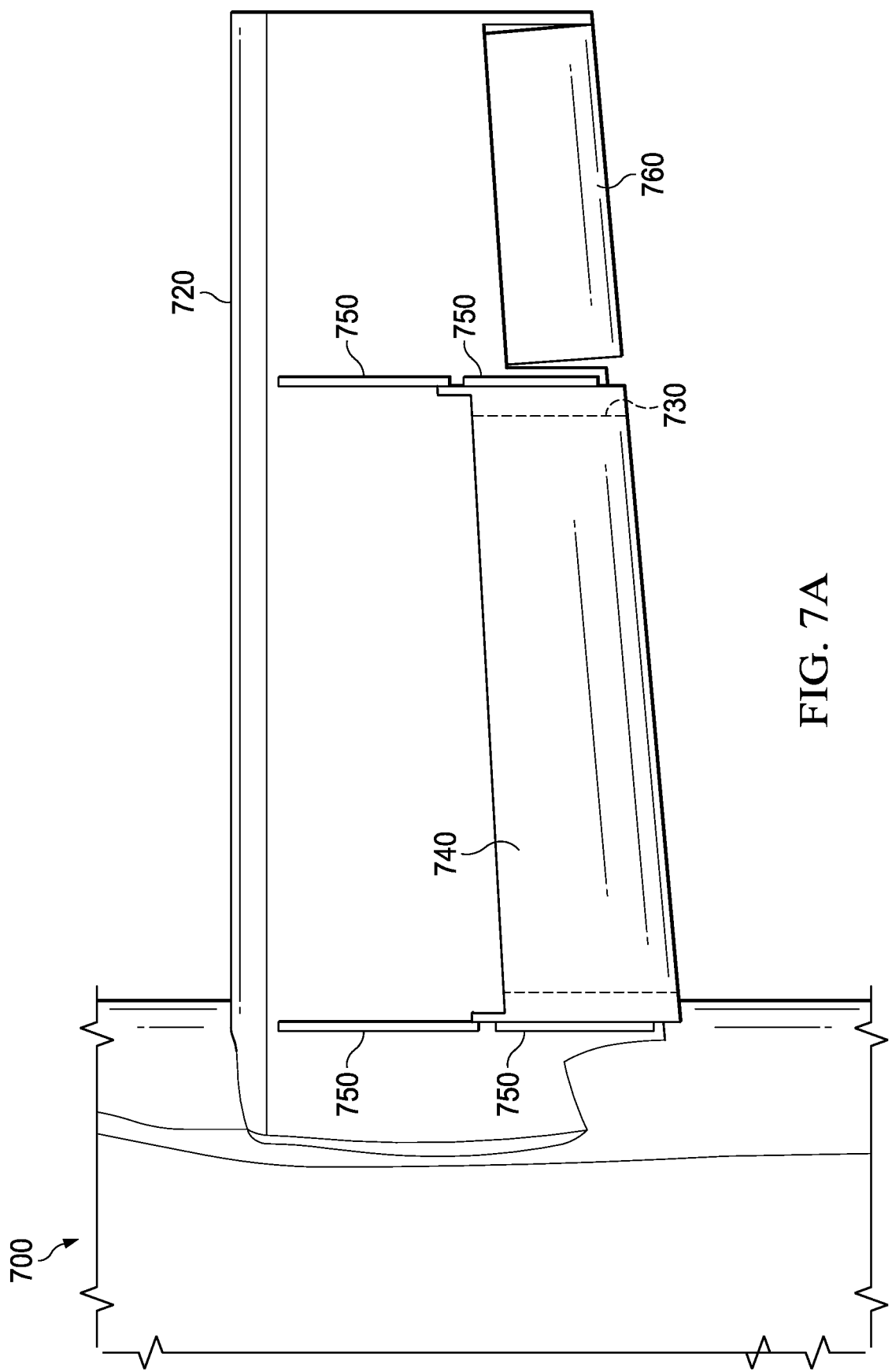
FIGS. 7A-7C show a sliding panel and wing embodiment under the present disclosure.
Figure 7B:
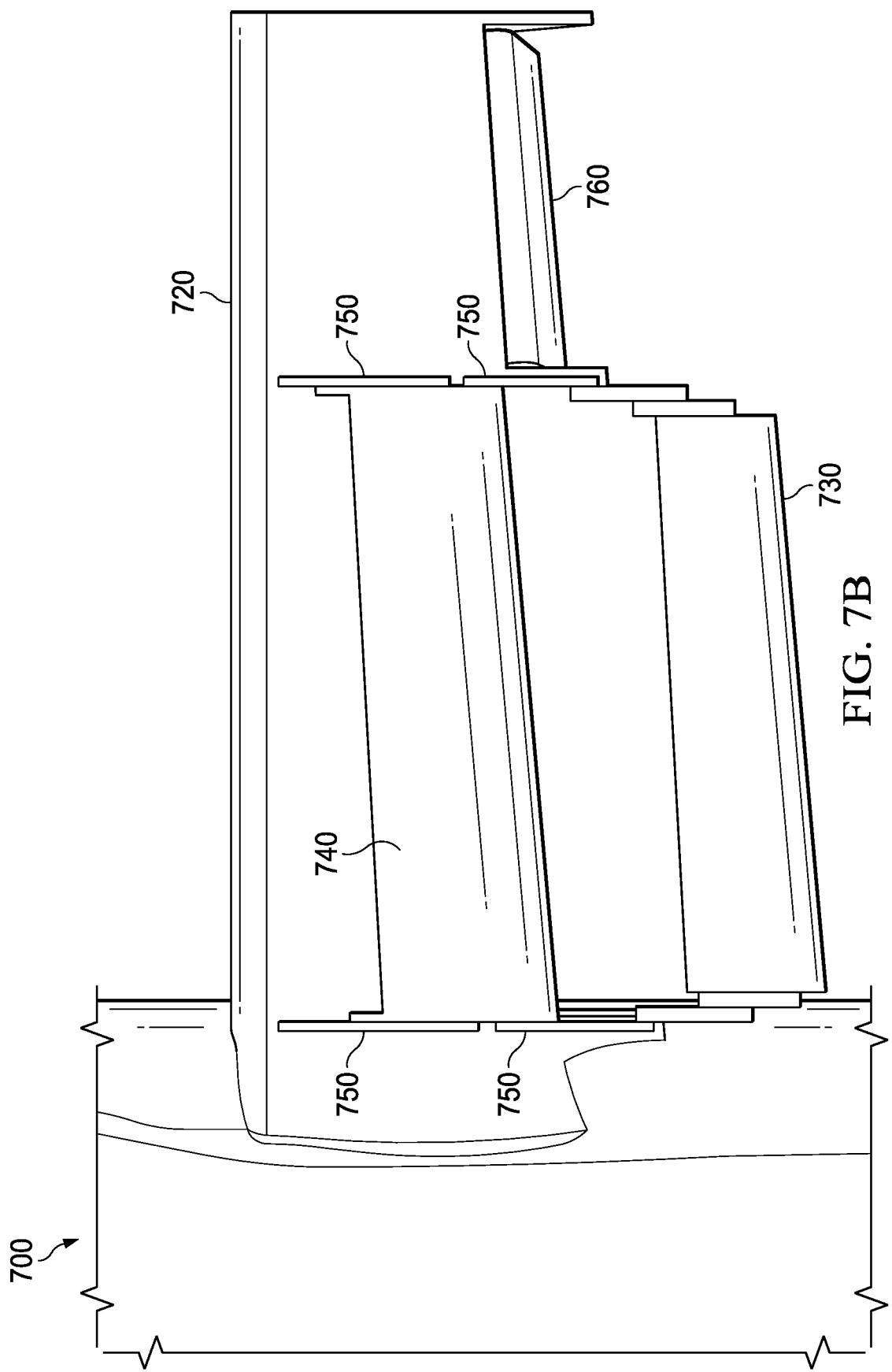
Figure 7C:
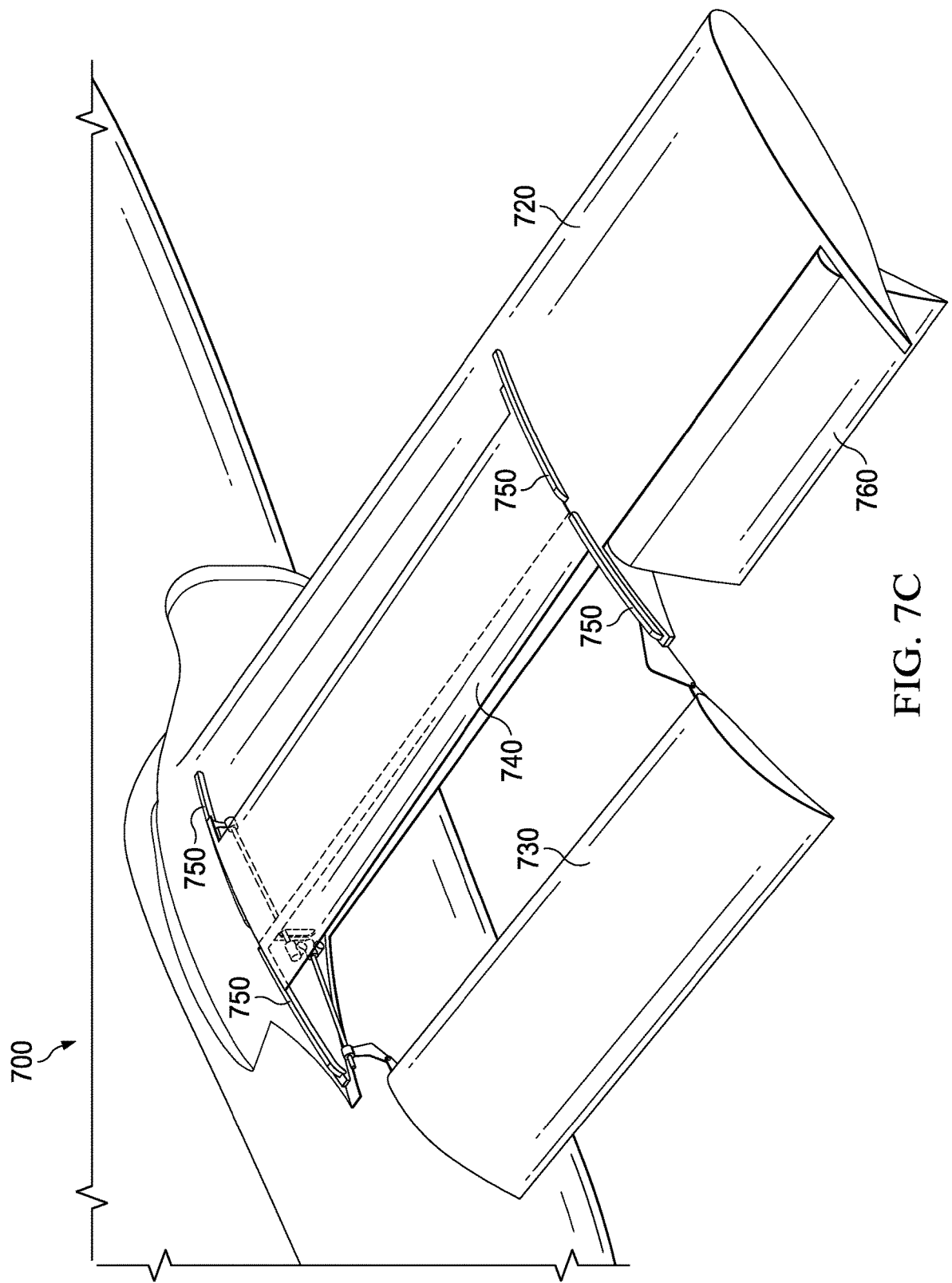

FIGS. 7A-7C show an aircraft embodiment 700 making use of the sliding panel of FIGS. 6A-6B. FIGS. 7A-7C also show how an aircraft can have a wing with both a sliding panel and a more traditional fowler flap in different portions of the wing. In FIG. 7A, wing 720 has a sliding panel 740 and fowler flap 730, both in retracted position. Tracks 750 allow for movement of the sliding panel 740. In this embodiment, the sliding panel 740 only comprises a portion of wing 720. Outboard of the sliding panel 740 there is a traditional aileron/flap 760. FIG. 7B shows wing 720 with deployed sliding panel 740 and fowler flap 730, as well as downward pointing aileron/flap 760. Aileron/flap 760 can, in some embodiments, also be directed upward, such as when braking. FIG. 7C shows wing 720 and aircraft 700 from a perspective view. Although not shown in the illustrations for clarity, the rotating pylon containing the lifting rotor assembly would be mounted at the most outboard location at the wingtips.

Figure 8:
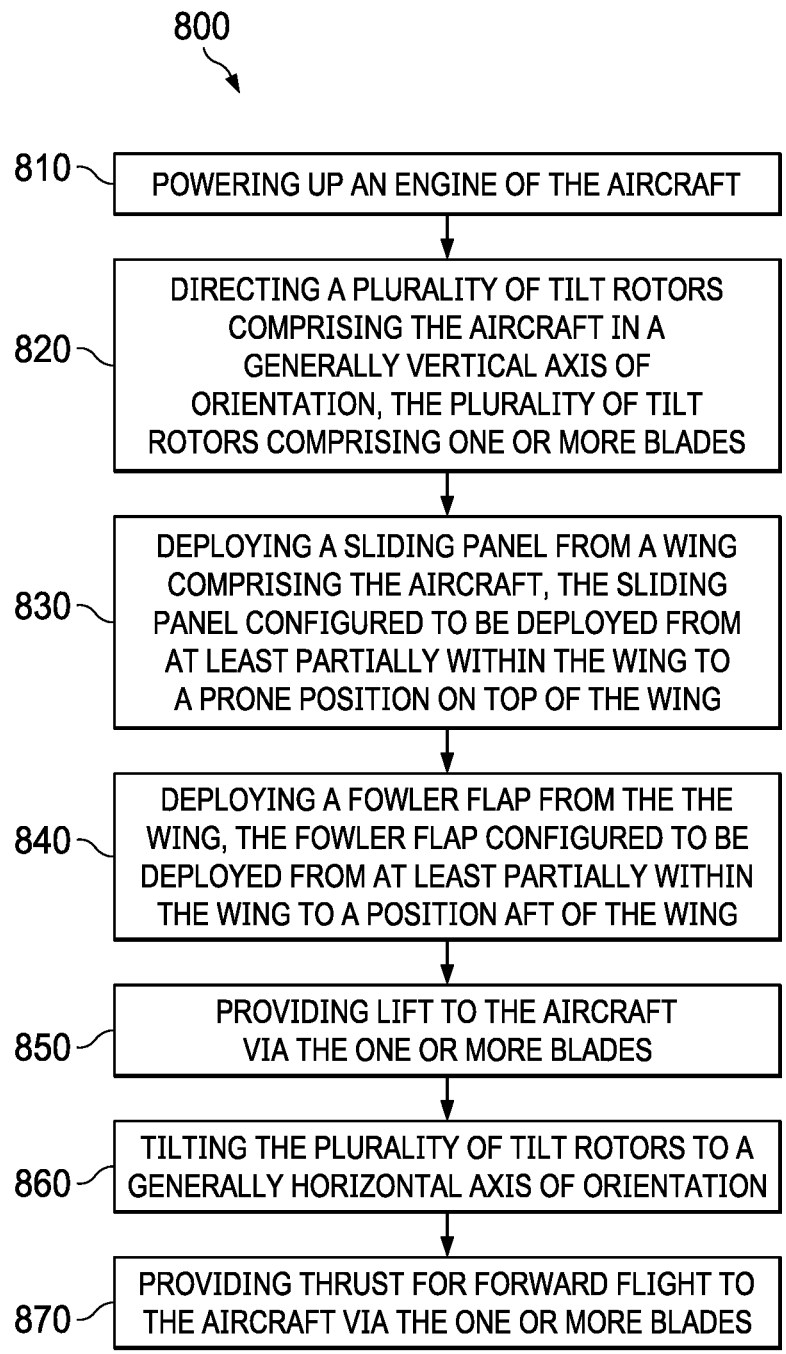
FIG. 8 is a flow chart of a method embodiment under the present disclosure.

One possible method embodiment of the present disclosure is a method of operating an aircraft 800, seen in FIG. 8. Step 810 is powering up an engine of the aircraft. Step 820 is directing a plurality of tilt rotors comprising the aircraft in a generally vertical axis of orientation, the plurality of tilt rotors comprising one or more blades. Step 830 is deploying a sliding panel from a wing comprising the aircraft, the sliding panel configured to be deployed from at least partially within the wing to a prone position on top of the wing. Step 840 is deploying a fowler flap from the wing, the fowler flap configured to be deployed from at least partially within the wing to a position aft of the wing. Step 850 is providing lift to the aircraft via the one or more blades. Step 860 is tilting the plurality of tilt rotors to a generally horizontal axis of orientation. Step 870 is providing thrust for forward flight to the aircraft via the one or more blades.

Figure 9:
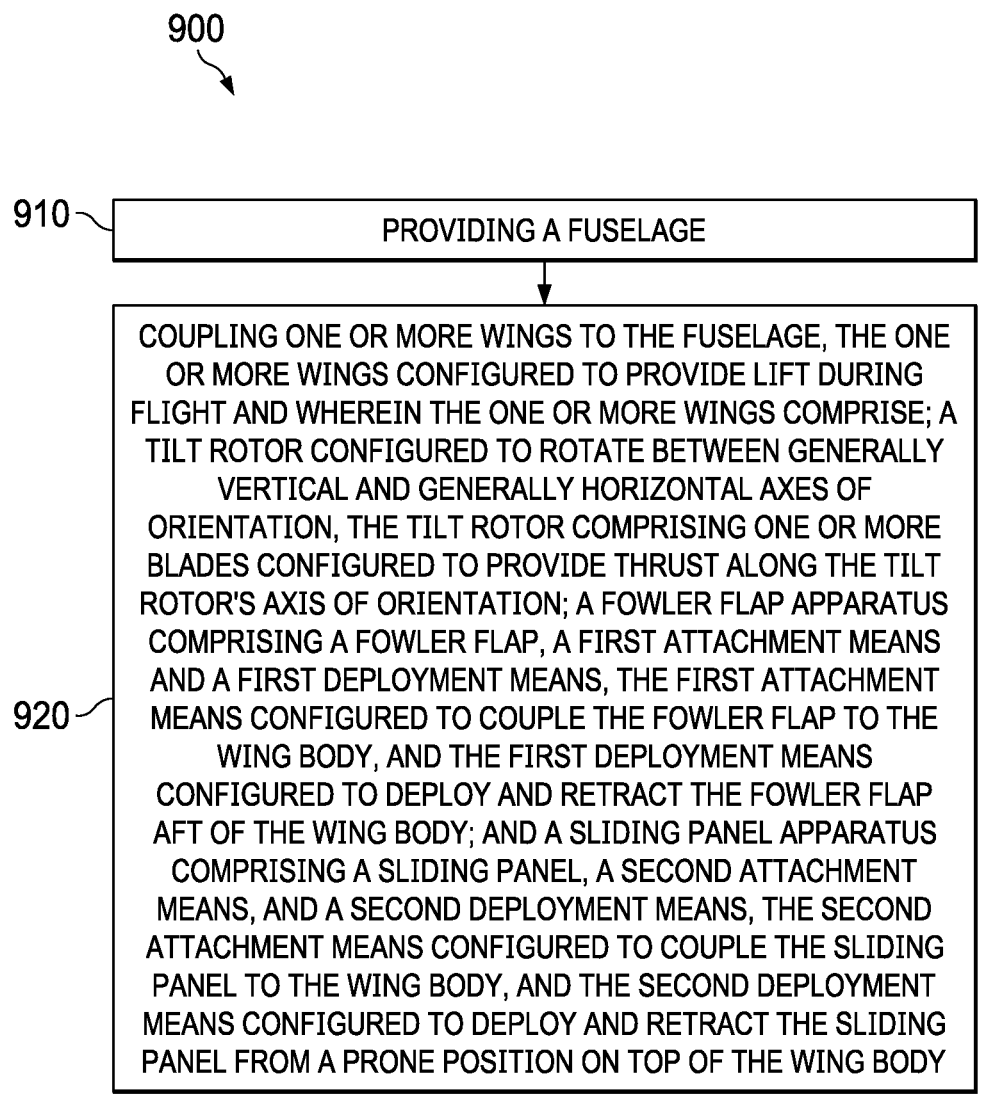
FIG. 9 is a flow chart of a method embodiment under the present disclosure.

Another possible method embodiment under the present disclosure is shown in FIG. 9. FIG. 9 shows a method of manufacture 900 of an aircraft. Step 910 is providing a fuselage. Step 920 is coupling one or more wings to the fuselage, the one or more wings configured to provide lift during flight and wherein the one or more wings comprise; a tilt rotor configured to rotate between generally vertical and generally horizontal axes of orientation, the tilt rotor comprising one or more blades configured to provide thrust along the tilt rotor's axis of orientation; a fowler flap apparatus comprising a fowler flap, a first attachment means and a first deployment means, the first attachment means configured to couple the fowler flap to the wing body, and the first deployment means configured to deploy and retract the fowler flap aft of the wing body; and a sliding panel apparatus comprising a sliding panel, a second attachment means, and a second deployment means, the second attachment means configured to couple the sliding panel to the wing body, and the second deployment means configured to deploy and retract the sliding panel from a prone position on top of the wing body.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wing apparatus for an aircraft, comprising:
   a wing body configured to provide lift to an aircraft during flight;
   a fowler flap apparatus comprising a fowler flap, a first attachment and a first deployer, the first attachment configured to couple the fowler flap to the wing body, and the first deployer configured to deploy the fowler flap in an aft direction from a stowed flap position to a deployed flap position in which the fowler flap is aft of the wing body; and
   a sliding panel apparatus comprising a sliding panel, a second attachment, and a second deployer, the second attachment configured to couple the sliding panel to the wing body, and the second deployer configured to deploy the sliding panel in a forward direction from a stowed panel position to a deployed panel position in which the sliding panel is prone on top of the wing body.

2. The wing apparatus of claim 1 wherein the first attachment comprises one or more bolts and one or more brackets.

3. The wing apparatus of claim 1 wherein the first deployer comprises one or more linear actuators.

4. The wing apparatus of claim 1 wherein the second attachment comprises one or more bolts and one or more brackets.

5. The wing apparatus of claim 1 wherein the second deployer comprises one or more actuators.

6. The wing apparatus of claim 1 wherein the fowler flap and the sliding panel are configured to nest within the wing body when the fowler flap and the sliding panel are in the stowed flap position and the stowed panel position, respectively.

7. The wing apparatus of claim 1 wherein the second deployer comprises one or more ball screws.

8. The wing apparatus of claim 1 wherein the sliding panel rests at least partially on top of the fowler flap when the fowler flap and the sliding panel are in the stowed flap position and the stowed panel position, respectively.

9. An aircraft comprising:
   a fuselage; and
   one or more wings coupled to the fuselage and configured to provide lift during forward flight, the one or more wings comprising;
   a tilt rotor configured to rotate between generally vertical and generally horizontal axes of orientation, the tilt rotor comprising one or more blades configured to provide thrust along the tilt rotor's axis of orientation;
   a wing body configured to provide lift to an aircraft during flight;
   a fowler flap apparatus comprising a fowler flap, a first attachment and a first deployer, the first attachment configured to couple the fowler flap to the wing body, and the first deployer configured to deploy the fowler flap in an aft direction from a stowed flap position to a deployed flap position in which the fowler flap is aft of the wing body; and
   a sliding panel apparatus comprising a sliding panel, a second attachment, and a second deployer, the second attachment configured to couple the sliding panel to the wing body, and the second deployer configured to deploy the sliding panel in a forward direction from a stowed panel position to a deployed panel position in which the sliding panel is prone on top of the wing body.

10. The aircraft of claim 9 wherein the first attachment comprises one or more bolts and one or more brackets.

11. The aircraft of claim 9 wherein the first deployer comprises one or more linear actuators.

12. The aircraft of claim 9 wherein the second attachment comprises one or more bolts and one or more brackets.

13. The aircraft of claim 9 wherein the second deployer comprises one or more actuators.

14. The aircraft of claim 9 wherein the fowler flap and the sliding panel are configured to nest within the wing body when the fowler flap and the sliding panel are in the stowed flap position and the stowed panel position, respectively.

15. The aircraft of claim 9 wherein the second deployer comprises one or more ball screws.

16. The aircraft of claim 9 wherein the sliding panel rests at least partially on top of the fowler flap when the fowler flap and the sliding panel are in the stowed flap position and the stowed panel position, respectively.

17. A method of operating an aircraft, comprising:
   powering up an engine of the aircraft;
   directing a plurality of tilt rotors of the aircraft in a generally vertical axis of orientation, the plurality of tilt rotors comprising one or more blades;
   deploying a sliding panel from a wing body of the aircraft, the sliding panel configured to be deployed from at least partially within the wing body to a prone position on top of the wing body;

deploying a fowler flap from the wing body, the fowler flap configured to be deployed from at least partially within the wing body to a position aft of the wing body;

providing lift to the aircraft via the one or more blades;

tilting the plurality of tilt rotors to a generally horizontal axis of orientation; and providing thrust for forward flight to the aircraft via the one or more blades.

18. The method of claim 17 wherein the sliding panel is generally planar shaped and is configured to have a low profile when in the prone position on top of the wing body.

19. The method of claim 17 further comprising retracting the sliding panel and maintaining the fowler flap deployed during forward flight.

20. The method of claim 17, wherein deploying the sliding panel includes deploying the sliding panel in a forward direction from at least partially within the wing body to the prone position on top of the wing body.

* * * * *